United States Patent [19]

Patel

[11] 4,377,830
[45] Mar. 22, 1983

[54] COMBINATION MAGNETIC DISK STORAGE DEVICE AND FILTER SYSTEM

[75] Inventor: Dilip C. Patel, Oklahoma City, Okla.

[73] Assignee: Magnetic Peripherals Inc., Minneapolis, Minn.

[21] Appl. No.: 255,311

[22] Filed: Apr. 17, 1981

[51] Int. Cl.³ .................. G11B 5/012; B01D 46/10
[52] U.S. Cl. ..................... 360/98; 55/338; 55/DIG. 29
[58] Field of Search ............ 55/338, 385 E, 502, 55/DIG. 29, 473, 510; 360/97–99; 369/261, 265; 346/137

[56] References Cited

U.S. PATENT DOCUMENTS

| | | | |
|---|---|---|---|
| 3,710,357 | 1/1973 | Buslik | 55/385 E |
| 3,800,325 | 3/1974 | O'Brien | 360/98 |
| 3,825,951 | 7/1974 | Katsumori et al. | 360/98 |
| 4,054,931 | 10/1977 | Bolton et al. | 360/97 |
| 4,092,687 | 5/1978 | Botsch | 360/97 |
| 4,308,041 | 12/1981 | Ellis | 55/385 E |

FOREIGN PATENT DOCUMENTS 2657368  6/1977  Fed. Rep. of Germany ........ 360/98

OTHER PUBLICATIONS

Contamination Control System for Disk Cartridge, IBM Technical Disclosure Bulletin, vol. 22, No. 1, Jun. 1979.

Primary Examiner—David L. Lacey
Attorney, Agent, or Firm—Edwin H. Crabtree

[57] ABSTRACT

A combination magnetic disk storage device and filter system for internally recirculating filtered air and reducing foreign particle contamination in the shroud area of a magnetic disk unit. The storage device and system having an air filter placed between an enclosed fixed disk and a removable disk received in a disk cartridge. By spinning the disks for a predetermined time prior to using the disk drive unit, the disks coact with the filter in circulating and filtering the air in the disk housing and the disk enclosures to substantially reduce the particle count to prevent read-write head crashes.

7 Claims, 7 Drawing Figures

COMBINATION MAGNETIC DISK STORAGE DEVICE AND FILTER SYSTEM

BACKGROUND OF THE INVENTION

This invention relates to an air filtering system for a magnetic disk drive unit and more particularly but not by way of limitation to a filtering system for filtering air in a pair of enclosures surrounding magnetic disks mounted one on top of the other on a drive spindle.

Heretofore disk drive units have filtered the air therein by using primarily external blowers using air turbulence and air flow guides. These systems have been described in the following prior art patents. They are:

U.S. Pat. No. 4,008,492, Elsing
U.S. Pat. No. 3,731,291, Walsh
U.S. Pat. No. 3,710,540, Standsell
U.S. Pat. No. 3,839,734, George et al.

None of the prior art patents disclose the unique features of the subject air filtering system as described herein.

SUMMARY OF THE INVENTION

The subject air filter system for a magnetic disk housing eliminates the use of an external blower mounted in or connected to the housing.

The system is simple in design, low in cost and by mounting a filter between the disk enclosures, the centrifugal force of the disks spinning in the enclosures coact with the filter in filtering the air in the enclosures and the disk housing. Also, because of the efficiency of the air filtering system, a small amount of leakage in the housing can be tolerated without jeopardizing the performance of the disk unit.

By spinning the disk prior to use for a period of approximately two minutes at 3500 rpm, the particle count of 0.42 microns or larger drops in the order of 500 or less particles per cubic foot from an initial count of greater than 200,000 particles per cubic foot.

By reducing the particle count in the shroud area of the disk housing and the enclosures of the fixed disk and removable disk, the unit becomes free of contamination and the likelihood of head crashes of the read-write head are greatly reduced.

Further, the air filter system not only circulates and cleans the air in the magnetic housing prior to using the unit but the housing is continuously cleaned during the operation of the unit.

The air filter system for cleaning air in the housing of a magnetic disk memory storage device includes a first magnetic disk rotatably mounted on a drive spindle. The disk is surrounded by a first enclosure having an opening adjacent the outer diameter of the disk. The first opening is adapted for receiving a read-write head therethrough and for discharging air from the first enclosure when the disk is rotated therein. The first enclosure also includes a second opening disposed in the top of the first enclosure and adjacent the inner diameter of the first disk. A second magnetic disk is removably engaged and rotatably mounted on the top of the drive spindle. A second enclosure is disposed around the second disk and includes a first opening adapted for receiving a read-write head therethrough for recording and receiving data from the second disk. The opening is also used for discharging air from the second enclosure when the second disk is rotated therein. A second opening is disposed in the bottom of the second enclosure and adjacent the inner diameter of the second disk. An air filter is received on top of the first enclosure and against the bottom of the second enclosure and provides a seal therebetween. The air filter is adjacent the second openings of the first and second enclosure and receives the air discharged from the first and second enclosures and filters the air as it passes through the filter and into the second openings of the first and second enclosure.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
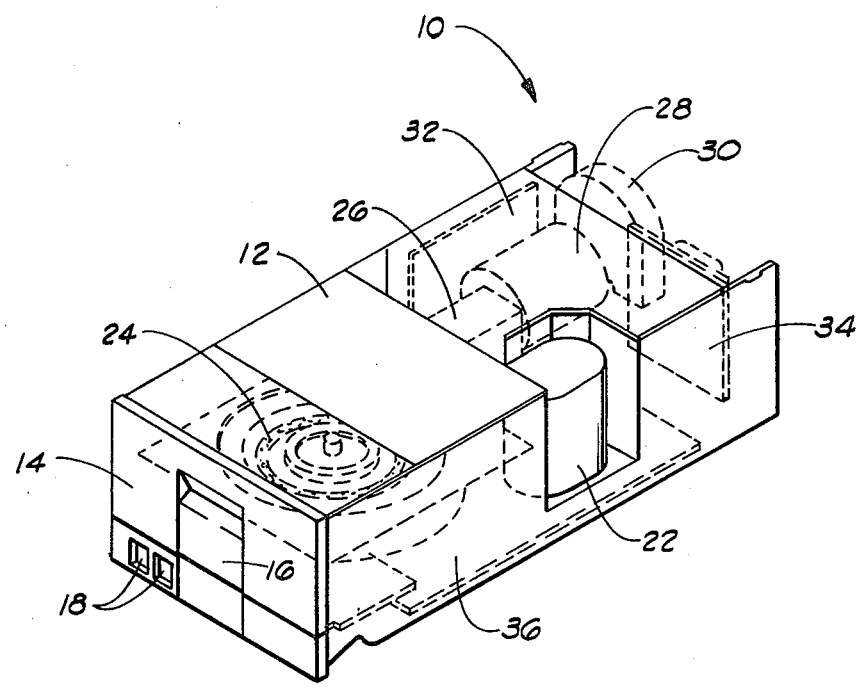
FIG. 1 is a perspective view of the magnetic disk memory storage unit.

In FIG. 1 a perspective view of a magnetic disk storage device is shown and designated by general reference numeral 10. The device 10 includes a housing 12 with a cartridge door 14 and a door latch 16. Also mounted in front of the housing 12 are operator control switches and indicators 18.

Shown in dotted lines inside the housing 12 is a drive spindle 20 rotatably driven by a spindle motor 22. Positioned around the spindle 20 is a hollow annular air filter 24. Also shown in this drawing and part of the device 10 is a carriage rail support 26, a voice coil actuator 28, a blower 30 along with a preamp PWA 32, an AC distribution PWA 34, and a base PWA 36.

Figure 2:
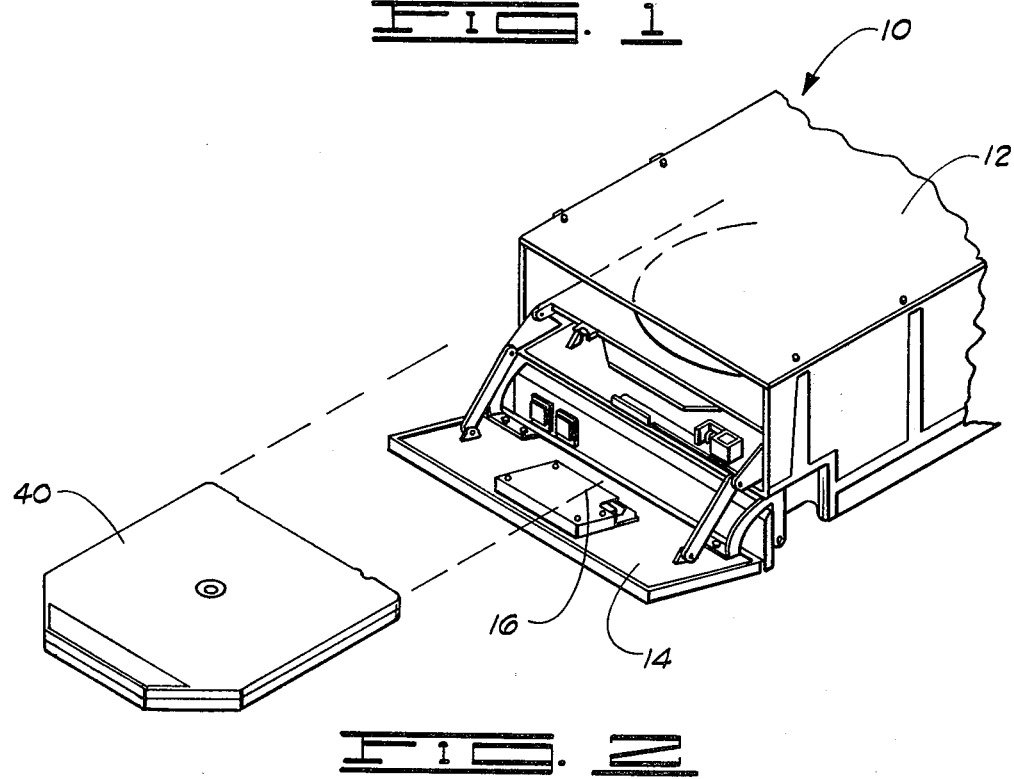
FIG. 2 is a perspective view of the unit with the front of the unit in an open position ready to receive a disk cartridge having a magnetic disk mounted therein.

In FIG. 2 the magnetic disk storage device 10 can be seen with the cartridge door 14 in an open position ready for receiving a removable top loading disk cartridge 40.

Figures 2A, 2B:
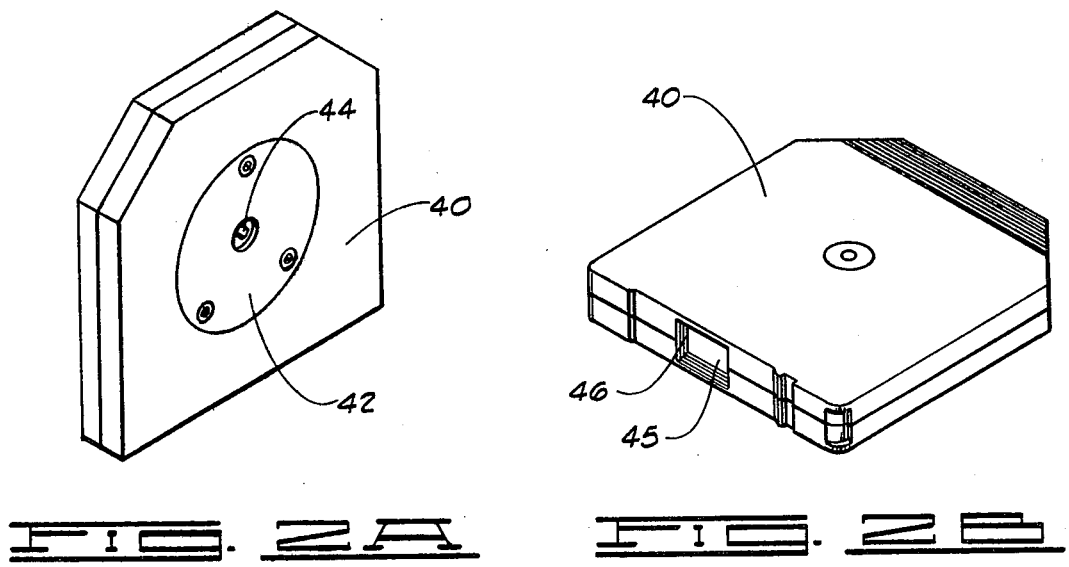
FIG. 2A is a perspective view showing the bottom of the disk cartridge and disk hub.
FIG. 2B is another perspective view of the disk cartridge showing an opening therein for receiving a read-write head.

In FIG. 2A a bottom perspective view of the disk cartridge 40 can be seen with an armature plate 42 and a centering ball 44.

In FIG. 2B a front perspective view of the cartridge can be seen with a read-write head access door 45 mounted in front of an opening 46. When the cartridge 40 is loaded into the housing 12 the access door 45 is automatically opened for receiving a read-write head. The read-write head is not shown in the drawings. When the cartridge 40 at a later date is removed from the unit 10, the door 45 automatically closes to prevent contamination of the disk inside the cartridge 40.

Figure 3:
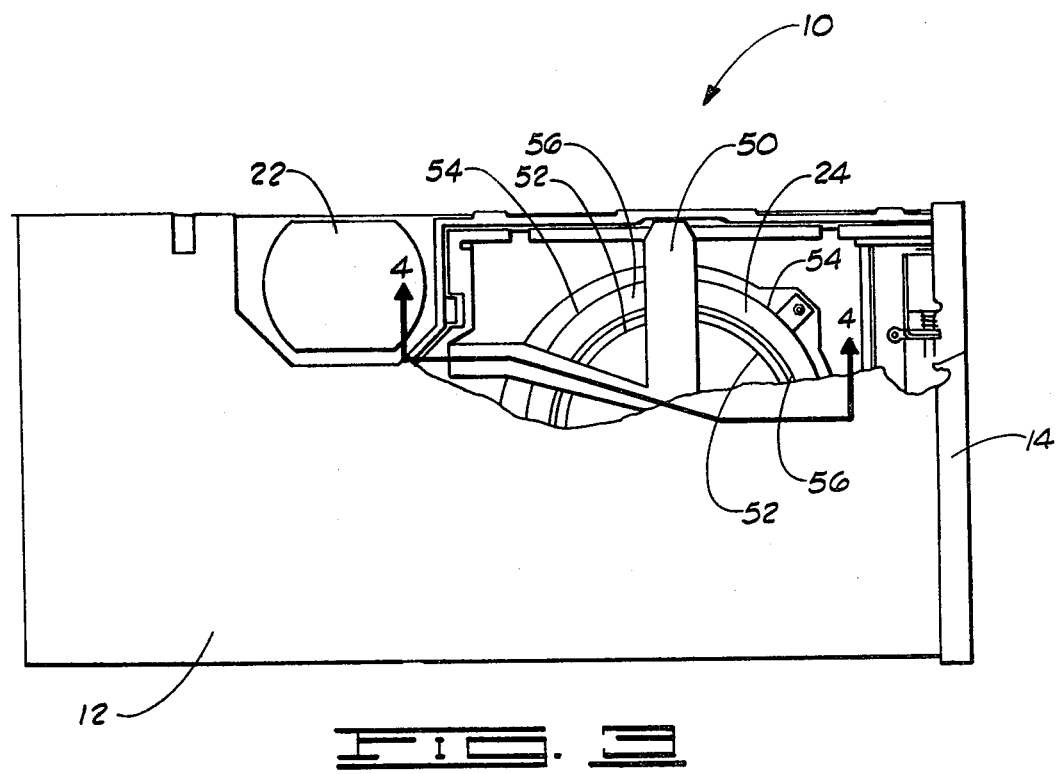
FIG. 3 is a top view of the unit with a partial cutaway of the housing showing a portion of a load pad and air filter.

In FIG. 3 a top view of the housing 12 is shown with a portion of the top cut-away to illustrate the shroud area of the housing 12 used for receiving the cartridge 40 therein. The cartridge 40 is received between a load pad 50 which centers the cartridge 40 therein and lowers it into a loaded position on top of the drive spindle 20. Also seen in this view is the hollow annular air filter 24 having an inner diameter 52, an outer diameter 54 and a circular ring 56 disposed on top of the filter 24 and therearound. A cross-section of the filter 24 is shown more clearly in FIGS. 4 and 5 of the drawings. Also, shown is a top view of the cartridge door 14 in a closed position. It should be noted that in this figure the cartridge 40 has been removed.

Figure 4:
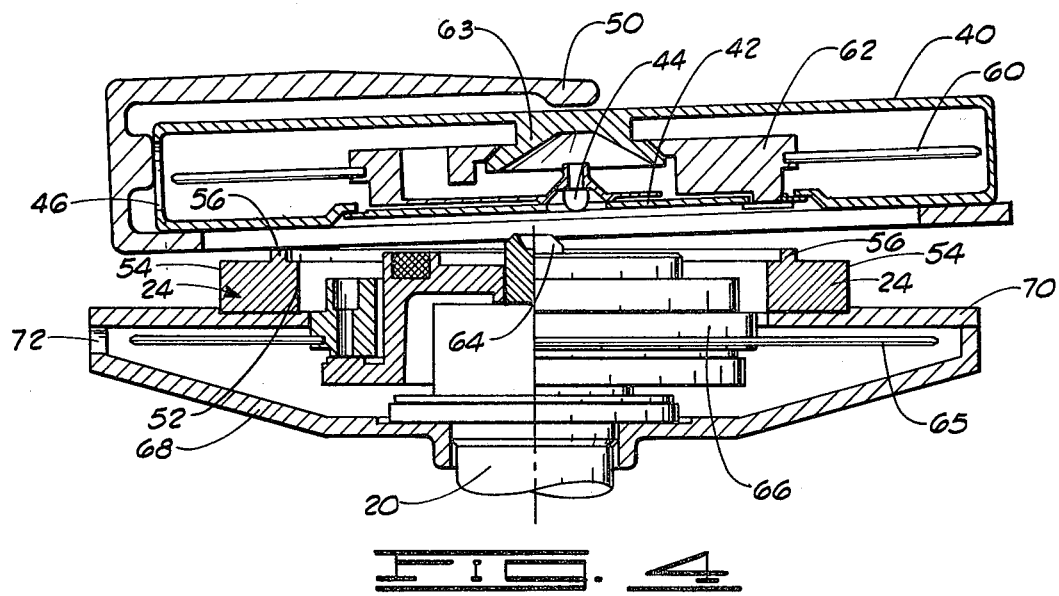
FIG. 4 is a side cross-section taken along lines 4—4 shown in FIG. 3 and including the removable disk cartridge received therein.
Figure 5:
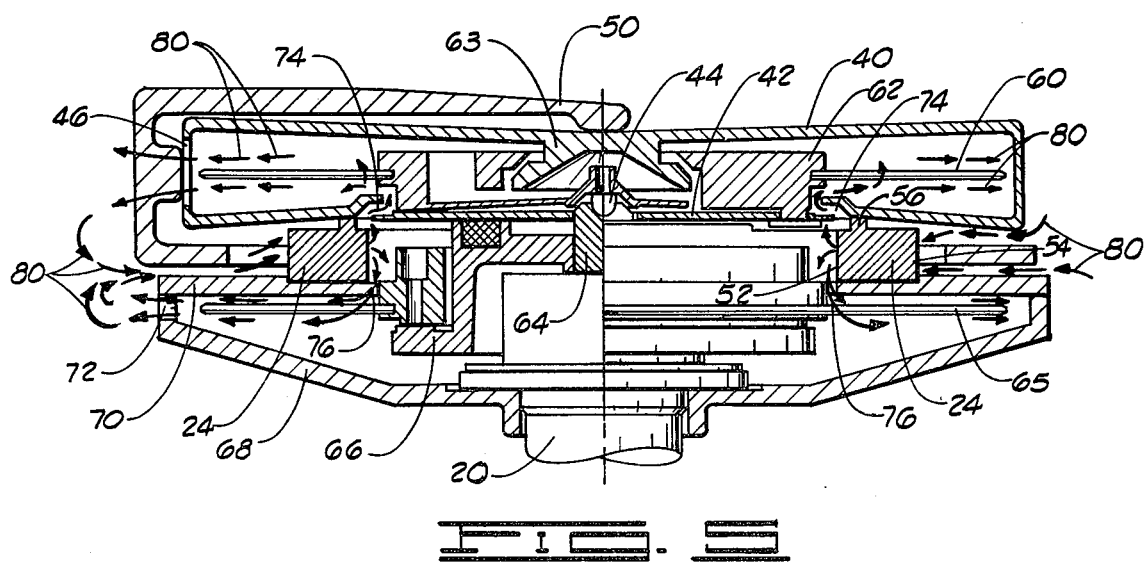
FIG. 5 is similar to FIG. 4 but with the removable disk cartridge rotatably mounted on top of the drive spindle.

A cross-section of the subject air filtering system is shown with the cartridge 40 in an unloaded position in FIG. 4 and in a loaded position in FIG. 5. This cross-section is shown taken along lines 4—4 in FIG. 3.

In FIG. 4 the cartridge 40 is shown received in the load pad 50. A rotatable magnetic storage disk 60 is shown mounted on a hub 62, and surrounded therein by the cartridge 40. The hub 62 includes the centering ball 44. Also shown in this view is a cross-section of the armature plate 42. On the left hand side of the cartridge 40 is the opening 46 which is used to receive the read-write head therethrough. The cartridge 40 includes a lift collar 63 which when the cartridge 40 is unloaded, holds the hub 62 in a secured position to prevent movement of the disk 60 with the armature plate 42 held against the sides of the bottom of the cartridge 40. Below the cartridge 40 and attached to the top of the spindle 20 is a spindle cone 64 for receiving the centering ball 44 when the cartridge 40 is in a loaded position.

A second rotatable magnetic storage disk 65 is mounted on a hub 66 which is secured in a fixed position on the spindle 20. The disk 65 is not removable. The fixed disk 65 is surrounded by an enclosure which includes a base plate 68 which surrounds the bottom of the disk 65 and extends upwardly around the outer diameter of the disk 65. Mounted on the top of the base plate 68 and completing the enclosure is a separator plate 70. An opening 72 is provided as shown in the drawings on the left side of the base plate 68 for receiving a read-write head therethrough for recording and receiving data from the disk 65. The read-write head is not shown in the drawings.

In FIG. 5 the load pad 50 has been lowered on top of the cartridge 40 with the centering ball 44 received in the top of the spindle cone 64, placing the cartridge 40 in a loaded position. At this time, the load pad 50 compresses the flexible cartridge 40 inwardly with the lift collar 63 released from the sides of the hub 62 so the disk 60 is free to rotate inside the cartridge 40. At the same time, the air filter 24 with the annular ring 56 therearound engages the sides of the bottom of the cartridge 40 adjacent the hub 62 and as the cartridge 40 is lowered by the load pad 50, the ring 56 urges the bottom of the cartridge 40 upwardly forming an opening 74 therearound. This opening is adjacent the inner diameter 52 of the air filter 24. Also adjacent the inner diameter 52 of the air filter 24 is an opening 76 in the top of the separator plate 70.

The device 10 is now ready for receiving the read-write heads and recording or receiving data from the disks 60 and 65. But prior to the recording or receiving data, the disks 60 and 65 are rotated for approximately two minutes to allow for cleaning the air in the housing 12 and in the enclosure formed by the cartridge 40 and the base plate 68 and separator plate 70. During this time due to the centrifugal force provided by the disks 60 and 65, the air inside the enclosures is discharged outwardly past the outer diameter of the disks as indicated by arrows 80 which are shown moving outwardly from the openings 72 and 46. At the same time, the air indicated by the arrows 80 is recirculated between the top of the plate 70 and the bottom of cartridge 40. The air is then received through the outer diameter 54 of the air filter 24, through the filter 24, and recirculated into the enclosures through the opening 74 in the cartridge 40 and the opening 76 around the top of the separator plate 70.

It should be noted the filter 24 is held tightly on top of the separator plate 70 providing a seal therebetween with the ring 56 bearing against the bottom of the cartridge 40 also providing a seal between the filter 24 and the cartridge 40. In this way, the unique air filter system as described herein provides for filtering the air prior to the use of the magnetic disk storage device 10, continuously cleaning the air during the operation of the device 10 and cleaning any air received in the housing 12 should there be a certain amount of leakage therein.

Changes may be made in the construction and arrangement of the parts or elements of the embodiments as disclosed herein without departing from the spirit or scope of the invention as defined in the following claims.

I claim:

1. A combination magnetic disk storage device and air filter system for cleaning air in a housing, the storage device and air filter system adapted for mounting on a drive spindle and receiving a read-write head adjacent thereto, the storage device and air filtering system comprising:

a first magnetic disk rotatably mounted on the drive spindle;

a first enclosure disposed around the first disk and the drive spindle, the first enclosure having a first opening in the side of the first enclosure adjacent the outer circumference of the first disk, the first opening adapted for receiving the read-write head therethrough and recording and receiving data from the first disk, the first opening also used for discharging air from the first enclosure when the first disk is rotated therein and a second opening in the top of the first enclosure and adjacent the inner circumference of the first disk;

a second magnetic disk rotatably mounted on top of the drive spindle;

a second enclosure disposed around the second disk, the second enclosure having a third opening in the side of the second enclosure adjacent the outer circumference of the second disk, the third opening adapted for receiving a read-write head therethrough and recording and receiving data from the second disk, the third opening also used for discharging air from the second enclosure when the second disk is rotated therein and a fourth opening disposed in the bottom of the second enclosure and adjacent the inner circumference of the second disk; and an annular shaped air filter having an inner and outer circumference, the air filter received on top of the first enclosure and against the bottom of the second enclosure and providing a seal therebetween, the second and the fourth opening disposed adjacent the inner circumference of the filter for receiving filtered air therethrough as the air is circulated out of the first and third openings.

2. The combination magnetic disk storage device and air filter system as described in claim 1 wherein the second magnetic disk is removably engaged on top of the drive spindle and the second enclosure is a disk cartridge surrounding the removable second magnetic disk, the cartridge having an annular shaped armature plate with a centering ball mounted in the bottom thereof, the centering ball engaging the top of the drive spindle.

3. The combination magnetic disk storage device and air filter system as described in claim 2 wherein the air filter has an annular ring around the top thereof, the ring engaging the bottom of the disk cartridge adjacent the armature plate and urging the bottom of the cartridge upwardly away from the circumference of the armature plate and forming the fourth opening therein when the second disk is rotatably mounted on top of the drive spindle.

4. The combination magnetic disk storage device and air filter system as described in claim 1 wherein the first enclosure includes a circular shaped base plate disposed around the bottom and extending upwardly around the outer circumference of the first disk and a circular separator plate received on top of the base plate.

5. A combination magnetic disk storage device and air filter system for cleaning air in a housing, the storage device and air filter system adapted for mounting on a drive spindle and receiving a read-write head adjacent thereto, the storage device and air filtering system comprising:
a first magnetic disk rotatably mounted on the drive spindle:
a first enclosure disposed around the first disk and the drive spindle, the first enclosure having a first opening in the side of the first enclosure adjacent the outer circumference of the disk, the first opening adapted for receiving the read-write head therethrough and recording and receiving data from the first disk, the first opening also used for discharging air from the first enclosure when the first disk is rotated therein and a second opening in the top of the first enclosure and adjacent the inner circumference of the first disk;
a second magnetic disk removably engaged on top of the drive spindle and rotated thereon;
a second enclosure disposed around the removable second disk, the second enclosure having a third opening in the side of the second enclosure adjacent the outer circumference of the second disk, the third opening adapted for receiving a read-write head therethrough and recording and receiving data from the second disk, the third opening also used for discharging air from the second enclosure when the second disk is rotated therein and a fourth opening disposed in the bottom of the second enclosure and adjacent the inner circumference of the second disk; and
an annular shaped air filter having an inner and outer circumference, the air filter received on top of the first enclosure and against the bottom of the second enclosure and providing a seal therebetween, the second opening and the fourth opening disposed adjacent the inner circumference of the filter for receiving filtered air as the air is recirculated out of the first and third openings and through the filter.

6. The combination magnetic disk storage device and air filter system as described in claim 5 wherein the second enclosure is a disk cartridge surrounding the removable second magnetic disk, the cartridge having an annular shaped armature plate with a center ball mounted in the bottom thereof, the centering ball engaging the top of the drive spindle.

7. The combination magnetic disk storage device and air filter system as described in claim 6 wherein the air filter has an annular ring around the top thereof, the ring engaging the bottom of the disk cartridge adjacent the armature plate and urging the bottom of the cartridge upwardly away from the circumference of the armature plate and forming the fourth opening therein when the second disk is rotatably mounted on the top of the drive spindle.

* * * * *